US009605355B2

(12) United States Patent
Onomoto et al.

(10) Patent No.: US 9,605,355 B2
(45) Date of Patent: Mar. 28, 2017

(54) METHOD FOR PRODUCING ANODIC POROUS ALUMINA, METHOD FOR PRODUCING MOLDED ARTICLE HAVING MICROSCOPIC PATTERN ON SURFACE, AND MOLDED ARTICLE HAVING MICROSCOPIC PATTERN ON SURFACE

(71) Applicants: Mitsubishi Rayon Co., Ltd., Tokyo (JP); Kanagawa Academy of Science and Technology, Kawasaki-shi, Kanagawa (JP)

(72) Inventors: Hiroshi Onomoto, Otake (JP); Jitsuo Hirohata, Otake (JP); Eiko Okamoto, Otake (JP); Yuji Matsubara, Otake (JP); Masashi Ikawa, Otake (JP); Hideki Masuda, Tokyo (JP); Takashi Yanagishita, Tokyo (JP)

(73) Assignees: MITSUBISHI RAYON CO., LTD., Tokyo (JP); KANAGAWA ACADEMY OF SCIENCE AND TECHNOLOGY, Kanagawa (JP)

( * ) Notice: Subject to any disclaimer, the term of this patent is extended or adjusted under 35 U.S.C. 154(b) by 0 days.

(21) Appl. No.: 14/647,254

(22) PCT Filed: Dec. 9, 2013

(86) PCT No.: PCT/JP2013/082963
§ 371 (c)(1),
(2) Date: May 26, 2015

(87) PCT Pub. No.: WO2014/092048
PCT Pub. Date: Jun. 19, 2014

(65) Prior Publication Data
US 2015/0299888 A1 Oct. 22, 2015

(30) Foreign Application Priority Data
Dec. 10, 2012 (JP) ................................. 2012-269685

(51) Int. Cl.
C25D 11/06 (2006.01)
C25D 11/02 (2006.01)
(Continued)

(52) U.S. Cl.
CPC ............ C25D 11/06 (2013.01); B29C 59/022 (2013.01); C25D 11/024 (2013.01);
(Continued)

(58) Field of Classification Search
CPC .............................. C25D 11/06; C25D 11/024
See application file for complete search history.

(56) References Cited

U.S. PATENT DOCUMENTS 4,681,668 A * 7/1987 Davies .................. C25D 11/08
205/139
2008/0274375 A1 * 11/2008 Ng .......................... C25D 11/08
428/687
(Continued)

FOREIGN PATENT DOCUMENTS

JP S52-58028 A 5/1977
JP 2010-100941 A 5/2010
(Continued)

OTHER PUBLICATIONS

Written Opinion issued in International Application PCT/JP2013/082963.
(Continued)

Primary Examiner — Bryan D. Ripa
(74) Attorney, Agent, or Firm — Fitch, Even, Tabin & Flannery LLP

(57) ABSTRACT

This method for producing anodic porous alumina such that an oxide coating film having a plurality of minute pores is formed at the surface of an aluminum substrate is characterized by containing: a step (a) for immersing the aluminum substrate in an electrolytic liquid resulting from mixing a
(Continued)

plurality of acids; a step (b) for imposing a voltage on the aluminum substrate immersed in the electrolytic liquid; a step (c) for holding the aluminum substrate in the state of being immersed in the electrolytic liquid essentially without imposing a voltage on the aluminum substrate; and a step (d) for alternately repeating step (b) and step (c). By means of the present invention, it is possible using a simple device and with few steps to provide a method that easily produces anodic porous alumina such that an oxide coating film having a plurality of minute pores is formed at the surface of an aluminum substrate.

7 Claims, 2 Drawing Sheets

(51) Int. Cl.
- C25D 11/12 (2006.01)
- C25D 11/08 (2006.01)
- C25D 11/10 (2006.01)
- C25D 11/04 (2006.01)
- B29C 59/04 (2006.01)
- B29C 59/02 (2006.01)

(52) U.S. Cl.
CPC ............ *C25D 11/045* (2013.01); *C25D 11/08* (2013.01); *C25D 11/10* (2013.01); *C25D 11/12* (2013.01); *B29C 59/046* (2013.01); *B29C 2059/023* (2013.01)

(56) References Cited

U.S. PATENT DOCUMENTS

| | | | |
|---|---|---|---|
| 2012/0132529 A1 | 5/2012 | Zekry et al. | |
| 2012/0196090 A1 | 8/2012 | Isurugi et al. | |
| 2012/0318674 A1* | 12/2012 | Wada | C25D 11/04 205/108 |
| 2013/0088784 A1 | 4/2013 | Kojima et al. | |

FOREIGN PATENT DOCUMENTS

| | | | | |
|---|---|---|---|---|
| JP | WO 2011043464 A1 * | 4/2011 | | C25D 11/12 |
| JP | WO 2011105452 A1 * | 9/2011 | | C25D 11/04 |
| JP | 4849183 B1 | 1/2012 | | |
| JP | 2012-117144 A | 6/2012 | | |
| WO | 2011/043464 A1 | 4/2011 | | |
| WO | 2011/132771 A1 | 10/2011 | | |

OTHER PUBLICATIONS

Office Action mailed Jul. 25, 2016, for Chinese Application No. 201380064072.6, together with English translation thereof.
Chozo Yoshimura et al., "A Method of Repetitive Flash Anodizing of Aluminum with Momentry High Current at Electroless State in Acid Bath", The Journal of the Surface Finishing Society of Japan, Feb. 1993, vol. 44, No. 2, pp. 151-155.
Kazuo Yokoyama, "Denryu no Kaifuku Koka o Riyo suru Alminium no Yokyoku Sankaho", The Journal of the Metal Finishing Society, 1977, vol. 28, No. 6, pp. 314-318.
International Search Report dated Feb. 18, 2014, issued in International Application PCT/JP2013/082963.
Written Opinion dated Feb. 3, 2014, issued in International Application PCT/JP2013/082963.

* cited by examiner

METHOD FOR PRODUCING ANODIC POROUS ALUMINA, METHOD FOR PRODUCING MOLDED ARTICLE HAVING MICROSCOPIC PATTERN ON SURFACE, AND MOLDED ARTICLE HAVING MICROSCOPIC PATTERN ON SURFACE

CROSS-REFERENCE TO RELATED APPLICATIONS

This Application is a U.S. National Stage Application filed under 35 U.S.C. §371 of International Application PCT/JP2013/082963, filed Dec. 9, 2013, designating the United States, which claims priority from Japanese Patent Application 2012-269685, filed in the Japan Patent Office on Dec. 10, 2012, the complete disclosures of which are hereby incorporated herein by reference in their entirety for all purposes.

FIELD OF THE INVENTION

The present invention relates to a method for producing anodic porous alumina having an oxide layer with multiple pores formed on a surface of an aluminum substrate, a method for producing a molded article having a microscopic pattern on its surface, and a molded article having a microscopic pattern on its surface.

BACKGROUND ART

Recent technological advances in microscopic fabrication have made it possible to provide a microscopic nanoscale structure on surfaces of molded articles. Especially, a microscopic pattern, which is referred to as a "moth-eye structure," is known to be capable of expressing antireflective effects by forming a region of graded refractive indices increasing from the refractive index of air to that of a material. Optical films having a surface with a microscopic pattern possessing a cycle shorter than the wavelength of visible light, namely, having a moth-eye structure, are drawing attention because of their antireflective properties.

In addition to antireflective properties, because of their original properties such as water repellency, referred to as a lotus effect, industrial applications of microscopic nanoscale structures have been intensively studied.

Various technologies are employed to provide a microscopic pattern on surfaces of molded articles. Among them, a method for transferring a microscopic pattern formed on a mold to a surface of a molded article is suitable for industrial production, since such a simplified method requires fewer steps to provide a microscopic pattern. In recent years, a method for using an oxide layer having multiple pores obtained by anodizing an aluminum substrate (anodic porous alumina) has been cited as a simplified method for producing a mold with a large surface area having a microscopic pattern.

To produce anodic porous alumina, an anodizing process is preferred to be conducted in two steps to achieve both a desired pore depth and an ordered array of pores; namely, by a method for forming desired pores on a mold by consecutively conducting steps (I)~(III) below.

(I): a step for forming an oxide layer by anodizing a surface of an aluminum substrate to obtain an ordered array of pores without paying attention to their depths;

(II): a step for removing a portion of or the entire oxide layer formed in step (I); and (III): after step (II), the aluminum substrate is anodized again to form pores with a desired depth while maintaining the ordered array.

In the method above, anodic porous alumina having a desired porous pattern is obtained by conducting step (III) which repeats step (I) for forming an oxide layer having multiple pores by anodizing an aluminum substrate and step (II) for enlarging the diameter of the pores. For example, patent publication (1) discloses a method for forming tapered pores in a metal substrate by repeating an anodizing process and an etching process.

PRIOR ART PUBLICATION

Patent Publication

Patent publication 1: Japanese Patent No. 4849183

SUMMARY OF THE INVENTION

Problems to be Solved by the Invention

However, to repeat anodizing and etching procedures in the method described in patent publication (1), a bath for anodization and another bath for etching need to be prepared separately, and to conduct the procedures consecutively, it is necessary to take out an aluminum substrate from one bath and immerse it in another bath. Thus, the method is inevitably complicated, requiring more apparatuses and procedures.

The present invention was carried out to solve the above problems. Its objective is to provide a simplified method for producing anodic porous alumina where an oxide layer with multiple pores is formed on an aluminum substrate surface.

Solutions to the Problems

After conducting intensive studies to solve the aforementioned problems, the inventors of the present invention have found that anodization and etching can be conducted in one reaction bath by using a mixed solution of acids that are effective for anodization and acids that are effective for etching. Accordingly, the present invention was completed. Namely, first, when an aluminum substrate is immersed in an electrolyte containing two or more acids and a voltage is applied, anodization progresses on the aluminum substrate surface to deepen the pores, and then when the voltage application is suspended, etching progresses on the aluminum substrate in the electrolyte to enlarge the pores. As described, the inventors have found that anodic porous alumina having tapered pores is obtained by such a simplified method as applying a voltage intermittently on an aluminum substrate immersed in an electrolyte containing two or more acids. Both procedures are conducted in one reaction bath, thereby eliminating extra procedures for taking out an aluminum substrate from a bath after anodization and immersing the substrate in another bath for etching. As a result, the production process and apparatus are both simplified.

The present invention has the following aspects.

[1] A method for producing anodic porous alumina where an oxide layer having multiple pores is formed on an aluminum substrate surface; the method includes the following steps:

step (a) for immersing an aluminum substrate in an electrolyte containing two or more acids;

step (b) for applying a voltage on the aluminum substrate immersed in the electrolyte;

step (c) for keeping the aluminum substrate immersed in the electrolyte while applying substantially no voltage; and step (d) for repeating steps (b) and (c).

[2] The method for producing anodic porous alumina as described in [1] above, characterized in that the two or more acids are at least two kinds of acids selected from sulfuric acid, phosphoric acid, oxalic acid, malonic acid, tartaric acid, succinic acid, malic acid and citric acid.

[3] The method for producing anodic porous alumina as described in [1] or [2] above, characterized in that the two or more acids include oxalic acid and phosphoric acid.

[4] The method for producing anodic porous alumina as described in [3] above, characterized in that the temperature of the electrolyte is at least 10° C. but lower than 25° C., and the phosphoric acid concentration (M) (mol/L) and time (T) (min.) for keeping the aluminum substrate immersed in the electrolyte are set to satisfy the formulas (1) and (2) below.

$$1 \leq T \leq 90 \quad (1)$$

$$-90(2M-1) \leq T \quad (2)$$

[5] The method for producing anodic porous alumina as described in [4] above, characterized in that the temperature of the electrolyte is at least 10° C. but lower than 25° C., and the phosphoric acid concentration (M) (mol/L) and time (T) (min.) for keeping the aluminum substrate immersed in the electrolyte are set to satisfy the formula (2) above and (3) below.

$$1 \leq T \leq 45 \quad (3)$$

[6] The method for producing anodic porous alumina as described in [3] above, characterized in that the temperature of the electrolyte is at least 25° C. but lower than 35° C., and the concentration (M') (mol/L) of phosphoric acid and time (T') (min.) for keeping the aluminum substrate immersed in the electrolyte are set to satisfy the formulas (4) and (5) below.

$$1 \leq T' \leq 70 \quad (4)$$

$$-200M'+70 \leq T' \leq -12.5M'+70 \quad (5)$$

[7] The method for producing anodic porous alumina as described in [6] above, characterized in that the temperature of the electrolyte is at least 25° C. but lower than 35° C., and the phosphoric acid concentration (M') (mol/L) and time (T') (min.) for keeping the aluminum substrate immersed in the electrolyte are set to satisfy the formula (5) above and (6) below $$1 \leq T' \leq 45 \quad (6).$$

[8] The method for producing anodic porous alumina as described in [3] above, characterized in that the temperature of the electrolyte is 35° C. or higher and the phosphoric acid concentration (M") (mol/L) and time (T") (min.) for keeping the aluminum substrate immersed in the electrolyte are set to satisfy the formula (7) below.

$$T'' \leq -20M''+70 \quad (7)$$

[9] The method for producing anodic porous alumina as described in [8] above, characterized in that the temperature of the electrolyte is 35° C. or higher, and the phosphoric acid concentration (M") (mol/L) and time (T") (min.) for keeping the aluminum substrate immersed in the electrolyte are set to satisfy the formula (7) above and the formula (8) below.

$$1 \leq T'' \leq 45 \quad (8)$$

[10] The method for producing anodic porous alumina as described in any one of [1]~[9] above, characterized in that the voltage applied on the aluminum substrate in step (b) is in a range of 20V~120V.

[11] A mold for transferring a microscopic pattern, characterized in that the mold is made from anodic porous alumina obtained by the production method described in any one of [1]~[10] above.

[12] The mold for transferring a microscopic pattern described in [11] above, characterized in that the microscopic pattern has a pitch of 80~250 nm and a depth of 100~400 nm.

[13] A molded article having a microscopic pattern on its surface, characterized in that the microscopic pattern is the inverse of the microscopic pattern made of multiple pores formed on the surface of the mold described in [12] above.

[14] A method for producing the anodic porous alumina as described in any of [1]~[10] above, characterized in that the steps (b)~(d) are conducted in one reaction bath.

[15] The method for producing anodic porous alumina as described in any of [1]~[10] and [14] above, characterized in that the surface of the aluminum substrate immersed in the electrolyte in the step (a) has recesses that become points of origin for forming pores when anodized.

Effects of the Invention

Using the method for producing anodic porous alumina according to an aspect of the present invention, both anodizing and etching an aluminum substrate can be conducted in one reaction bath, eliminating an extra process for taking out the aluminum substrate from a bath after anodization and immersing it in another bath for etching. Accordingly, using a simplified apparatus and fewer steps, anodic porous alumina having an oxide layer with multiple pores is produced on the aluminum substrate surface. In addition, using the method for producing a molded article according to another aspect of the present invention, tapered pores are formed on the surface of a molded article by a using simplified method and fewer steps.

In the present application, the time when an aluminum substrate is kept immersed in an electrolyte without a voltage applied thereon may also be referred to as "etching time."

DETAILED DESCRIPTION OF EMBODIMENTS

Figure 1:
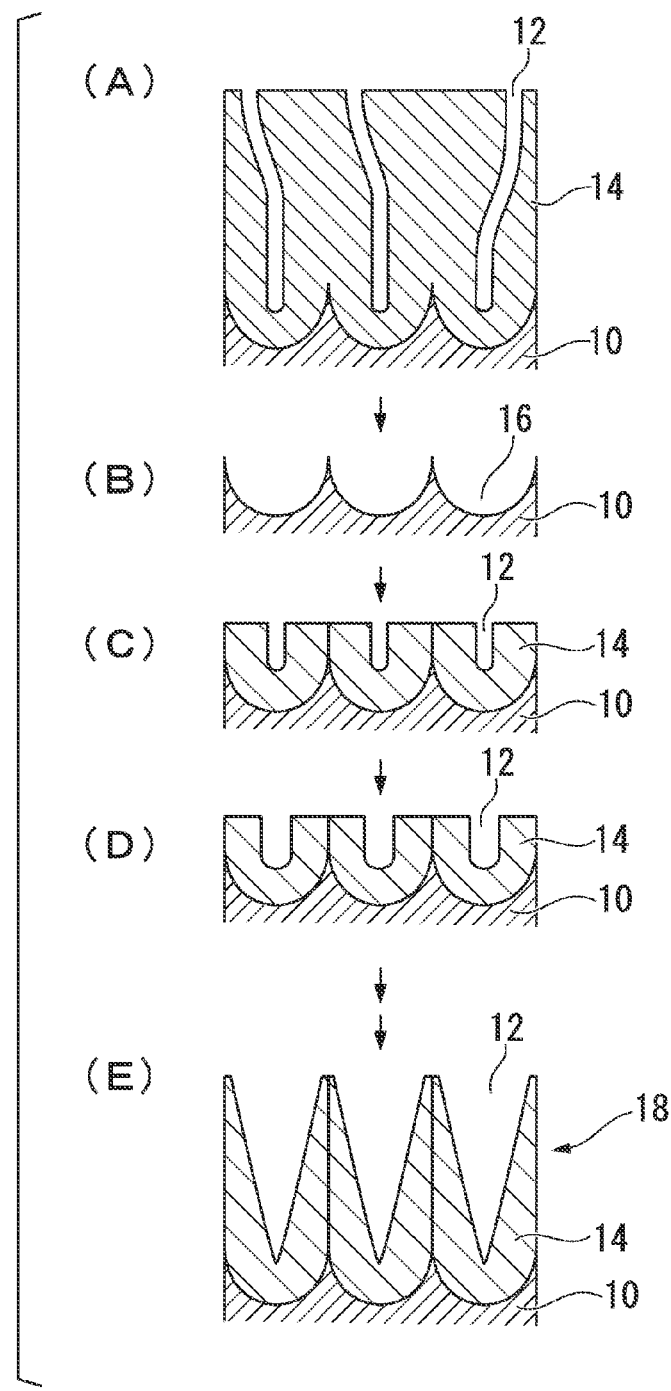
FIG. 1 shows cross-sectional views of the steps for producing anodic porous alumina.

In the present application, a "pore" indicates a concave portion of the microscopic pattern formed on a surface of anodic porous alumina.

The "interval of pores" indicates the average value of the distances taken between the centers of adjacent pores.

A "protrusion" indicates a convex portion of the microscopic pattern formed on a surface of a molded article.

Also, a "microscopic pattern" indicates such a structure having an average distance of 10~400 nm between protrusions or between concaves. Namely, a "microscopic pattern"

is such a structure having an average value (average distance) of 10~400 nm in the distance between the apexes of two adjacent protrusions or between the bottoms of two adjacent concaves. The distance between pores and between protrusions or concaves can be measured using a field emission scanning electron microscope.

In addition, "(meth)acrylate" refers to both acrylate and methacrylate.

"Active energy rays" indicate visible light, ultraviolet rays, electron beams, plasma, thermal rays (infrared rays) and the like.

<Method for Producing Anodic Porous Alumina>

The method for producing anodic porous alumina according to an embodiment of the present invention, is characterized by including steps (a)~(d) below.

step (a) for immersing an aluminum substrate in an electrolyte containing two or more acids;

step (b) for applying a voltage on the aluminum substrate immersed in the electrolyte;

step (c) for keeping the aluminum substrate immersed in the electrolyte while applying substantially no voltage; and step (d) for alternately repeating steps (b) and (c).

(Step (a))

In the method for producing anodic porous alumina according to an embodiment of the present invention, step (a) is a process for immersing an aluminum substrate in an electrolyte containing two or more acids.

The shape of an aluminum substrate is not limited specifically, and any shape such as a plate, column or cylinder may be used as long as it can be used as a mold. Also, in the method for producing anodic porous alumina, the aluminum substrate is preferred to be mechanically fabricated.

Here, "mechanically fabricated" indicates that electrolytic polish is not used but that the aluminum substrate surface is physically shaped or polished to achieve a mirror surface. Physical polishing methods include "tape polishing" and "CMP polishing." To achieve a mirror surface on an aluminum substrate surface, CMP polishing is preferred in an embodiment of the present invention.

The purity of an aluminum substrate, namely, the ratio of aluminum to the total mass of the aluminum substrate, is preferred to be 97~99.9 mass %, more preferably 99.5~99.9 mass %. An aluminum substrate with a purity of less than 97 mass % is not preferred, because the segregation of impurities during anodization may form an irregular structure that scatters visible light or may lower the degree of order of the pore array formed through anodization.

On the other hand, when highly pure aluminum is used as an aluminum substrate, such a substrate may be too soft to be molded into a desired shape (such as a cylindrical shape). Accordingly, it is an option to add magnesium to aluminum, to mold it into a desired shape and to use it as an aluminum substrate. When magnesium is added, the strength of the aluminum increases, making it easier to mold such aluminum. The amount of magnesium to be added is approximately 0.1~3 mass % of the total mass of the aluminum substrate.

In an embodiment of the present invention, on the aluminum substrate surface to be used in step (a), it is preferred that recesses be formed to work as points of origin for forming pores during anodization. Such recesses are preferred to be those formed in later-described steps (1) and (2).

As an electrolyte for immersing an aluminum substrate in steps (a)~(d), a mixed solution of two or more acids is used. In the present application, "two or more acids" indicate a combination of an acid that contributes to forming an oxide layer (hereinafter may also be referred to as a "first acid") and an acid useful in the etching process to enlarge the pores formed in the oxide layer (hereinafter may also be referred to as a "second acid").

The two or more acids are preferred to be at least two kinds selected from sulfuric acid, phosphoric acid, oxalic acid, malonic acid, tartaric acid, succinic acid, malic acid and citric acid.

Here, examples of the first acid are oxalic acid and sulfuric acid, and the second acid is preferred to be phosphoric acid.

Namely, in an embodiment of the present invention, an electrolyte for immersing an aluminum substrate is preferred to be a mixed solution of a first acid that contributes to forming an oxide layer and a second acid useful for etching to enlarge the pores formed in the oxide layer. Also, as for the first acid, it is preferred to be at least one acid selected from a group of oxalic acids and sulfuric acids. As for the second acid, a phosphoric acid is preferred.

In steps (a)~(d), by using a mixture of two or more acids as the electrolyte as described above, an anodizing process and etching process on an aluminum substrate surface can be conducted in one bath. As a result, after anodization, it is no longer necessary to take out the aluminum substrate from one bath and immerse it in another bath to conduct etching. Accordingly, the production process and apparatus are both simplified.

Moreover, the combination of two or more acids is preferred to be that of oxalic acid and phosphoric acid. It is preferred to use oxalic acid and phosphoric acid as the two or more acids, since highly ordered pores are more likely to be formed on the aluminum substrate surface, and it is easier to control the shape of the pores.

When only oxalic acid is used for anodization, if a large amount of current flows, a so-called thermal runaway or burning occurs. Accordingly, pores (hereinafter may also be referred to as "nanoholes") formed in the oxide layer may be destroyed. To suppress thermal runaway or burning, it is necessary to lower the concentration of oxalic acid in the electrolyte, or to anodize the aluminum substrate at a lower temperature by cooling the substrate.

However, if an aluminum substrate is anodized in an electrolyte containing oxalic acid as the first acid and phosphoric acid as the second acid, the density of current flowing through the aluminum substrate tends to be low compared with when anodization is conducted using only oxalic acid. Accordingly, heat generated in the aluminum substrate is suppressed, and a risk of thermal runaway or burning is lowered, thereby allowing anodization to be conducted at a greater voltage or at a higher temperature through a simplified method compared with conventional procedures.

In an embodiment of the present invention, anodizing an aluminum substrate in later-described step (b) is preferred to be conducted in an electrolyte with a temperature of 4° C. or higher but 50° C. or lower, more preferably 10° C. or higher but 45° C. or lower. The temperature in step (b) may be different from the temperature in later-described step (c). However, to simplify the production process of anodic porous alumina, steps (b) and (c) are preferred to be conducted at substantially the same temperature. In the present application, substantially the same temperatures means temperatures within a range of ±5° C.

(Preparation of Electrolyte)

The composition of an electrolyte containing two or more acids is preferred to be determined as follows: a first acid and a second acid are selected, and then the concentration of each acid is determined according to the voltage or the temperature of the electrolyte during anodization in step (b) and the temperature of the electrolyte during etching in step (c).

For example, when a high voltage that exceeds 40V is applied during anodization in step (b), the concentration of phosphoric acid contained as the second acid can be set higher, for example, at 0.5 mol/L or greater. By so setting, thermal runaway or burning is prevented.

When steps (b) and (c) are conducted at high temperatures, for example, in an electrolyte set at 30~45° C., the concentration of phosphoric acid mixed in as the second acid is set lower, for example, 2.5 mol/L or less. By so setting, excessively enlarged pores are prevented from resulting in irregular pore shapes.

Phosphoric acid added to the electrolyte as the second acid tends to slow the speed of enlarging pore diameters when the acid is set at a low concentration. Thus, when step (c) is conducted at a lower temperature, it is necessary to increase the phosphoric acid concentration, or to extend the time for keeping the aluminum substrate immersed in the electrolyte (also referred to as "etching time").

In an embodiment of the present invention, when step (c) is conducted in an electrolyte with a temperature of 10° C. or higher but lower than 25° C., the concentration (M) (mol/L) of phosphoric acid contained in the electrolyte as the second acid and time (T) (min.) for keeping the aluminum substrate immersed in the electrolyte are preferred to satisfy following formulas (1) and (2).

$$1 \leq T \leq 90 \quad (1)$$

$$-90(2M-1) \leq T \quad (2)$$

In formulas (1) and (2) above, (T) indicates time (min.) per etching treatment on the aluminum substrate in the electrolyte, and (M) is the concentration (mol/L) of phosphoric acid in the electrolyte when the temperature of the electrolyte in step (c) is set at 10° C. or higher but lower than 25° C.

Namely, when step (c) is conducted in an electrolyte with a temperature of 10° C. or higher but lower than 25° C., anodic porous alumina is produced efficiently by setting phosphoric acid concentration (M) and etching time (T) to be in a region below: namely, first a graph is created by setting the horizontal axis for concentration (M) of phosphoric acid contained in the electrolyte as the second acid and the vertical axis for time (T) for etching an aluminum substrate; a straight line that satisfies the above formula (2) is drawn in the graph; and then the region is specified to be surrounded by the above straight line and other straight lines at etching time T=1 and T=90.

Later-described step (d) repeats steps (b) and (c). To further reduce the production time for anodic porous alumina and achieve efficient production, time (T) for etching an aluminum substrate is preferred to be 90 minutes or shorter. In addition, by setting (T) at 1 minute or longer, pore diameters will be sufficiently enlarged. To produce anodic porous alumina even more efficiently, (T) is preferred to be 45 minutes or shorter.

Namely, in an embodiment of the present invention, when step (c) is conducted in an electrolyte with a temperature of 10° C. or higher but lower than 25° C., the concentration (M) (mol/L) of phosphoric acid contained in the electrolyte as the second acid and time (T) (min.) for keeping the aluminum substrate immersed in the electrolyte are more preferred to satisfy formula (2) above and formula (3) below.

$$1 \leq T \leq 45 \quad (3)$$

Also, it is preferred for the phosphoric acid concentration (M) to satisfy the above formula (2), since the diameter of the pores is sufficiently enlarged while the aluminum substrate is kept immersed for etching for (T) minutes in step (c).

If step (c) is conducted at a higher temperature, the time for immersing the aluminum substrate in the electrolyte can be set even shorter.

In an embodiment of the present invention, when step (c) is conducted in an electrolyte with a temperature of 25° C. or higher but lower than 35° C., the concentration (M') (mol/L) of phosphoric acid contained in the electrolyte as the second acid and time (T') (min.) for keeping the aluminum substrate immersed in the electrolyte are more preferred to satisfy formulas (4) and (5) below.

$$1 \leq T' \leq 70 \quad (4)$$

$$-200M'+70 \leq T' \leq -12.5M'+70 \quad (5)$$

In formulas (4) and (5) above, (T') indicates time (min.) per treatment for etching the aluminum substrate in the electrolyte, and (M') is the concentration (mol/L) of phosphoric acid in the electrolyte when the temperature of the electrolyte is set at 25° C. or higher but lower than 35° C.

Namely, when step (c) is conducted in an electrolyte with a temperature of 25° C. or higher but lower than 35° C., anodic porous alumina is produced efficiently by setting phosphoric acid concentration (M') and etching time (T') to be in a region below: namely, first a graph is created by setting the horizontal axis for concentration (M') of phosphoric acid contained in the electrolyte as the second acid and setting the vertical axis for time (T') for etching an aluminum substrate; and two straight lines that satisfy the above formula (4) are drawn in the graph to specify the region that is surrounded by the two straight lines.

Later-described step (d) repeats steps (b) and (c). To further reduce the production time for anodic porous alumina to achieve efficient production, time (T') for etching an aluminum substrate is preferred to be 70 minutes or shorter. In addition, by setting (T') at 1 minute or longer, pore diameters will be sufficiently enlarged. To even further efficiently produce anodic porous alumina, (T') is preferred to be 45 minutes or shorter.

Namely, in an embodiment of the present invention, when step (c) is conducted in an electrolyte with a temperature of 25° C. or higher but lower than 35° C., the concentration (M') (mol/L) of phosphoric acid contained in the electrolyte as the second acid and time (T') (min.) for keeping the aluminum substrate immersed in the electrolyte are more preferred to satisfy formula (5) above and formula (6) below.

$$1 \leq T' \leq 45 \quad (6)$$

Also, by setting phosphoric acid concentration (M') and etching time (T') in a range that satisfies the above formula (5), etching is prevented from progressing excessively, which would disturb the shape of the pores, while the concentration of the second acid is adjusted in a range that is sufficient to enlarge the pore diameter during etching time (T').

Moreover, in another embodiment of the present invention, when step (c) is conducted in an electrolyte that is 35° C. or higher, the concentration (M") (mol/L) of the phosphoric acid contained in the electrolyte as the second acid and time (T") (min.) for keeping the aluminum substrate immersed in the electrolyte are preferred to satisfy formula (7) below, more preferably to satisfy formulas (7) and (8) below.

$$T'' \leq -20M'' + 70 \quad (7)$$

$$1 \leq T'' \leq 45 \quad (8)$$

In formulas (7) and (8) above, (T") indicates time (min.) per treatment for etching the aluminum substrate in the electrolyte, and (M") is the concentration (mol/L) of phosphoric acid in the electrolyte when the temperature of the electrolyte in step (c) is set at 35° C. or higher.

Namely, when step (c) is conducted in an electrolyte with a temperature of 35° C. or higher, anodic porous alumina is produced efficiently by setting phosphoric acid concentration (M") and etching time (T") to be in a region below: namely, first a graph is created by setting the horizontal axis for concentration (M") of phosphoric acid contained in the electrolyte as the second acid and the vertical axis for time (T") for etching an aluminum substrate; and two straight lines that satisfy the above formula (6) are drawn in the graph to specify the region that is surrounded by the above straight lines.

Also, by setting phosphoric acid concentration (M") and etching time (T") in a range that satisfies the above formulas (7) and (8), etching is prevented from going too far, which would disturb the shape of the pores, while the concentration of the second acid in the electrolyte is adjusted in a range that is sufficient to enlarge the pore diameter during etching time (T").

When step (c) is conducted in an electrolyte with a temperature of 35° C. or higher in an embodiment of the present invention, the concentration of phosphoric acid contained in the electrolyte as the second acid is preferred to be 2 mol/L or lower.

In an embodiment of the present invention, the upper limit of the temperature of the electrolyte in step (c) is preferred to be 45° C. or lower to prevent thermal runaway or burning.

When the first acid is oxalic acid and the second acid is phosphoric acid in an embodiment of the present invention, the concentration of oxalic acid in the electrolyte is preferred to be at least 0.05 mol/L or greater but no higher than 1 mol/L regardless of the temperature of the electrolyte in step (b) or step (c). The concentration of oxalic acid in the electrolyte is preferred to be 1 mol/L or lower, since the surface of the formed oxide layer is prevented from being roughened, a condition caused by an excessively high current flowing through the aluminum substrate.

(Step (b))

In the method for producing anodic porous alumina according to an embodiment of the present invention, step (b) is for applying a voltage on the above aluminum substrate, which is immersed in the electrolyte containing two or more acids. Namely, step (b) is for anodizing an aluminum substrate in an electrolyte containing two or more acids.

When part of or the entire aluminum substrate is immersed in an electrolyte to anodize the substrate, an oxide layer is formed in portions immersed in the electrolyte containing two or more acids.

The composition and temperature of an electrolyte containing two or more acids affect the depth of pores during anodization and the speed of enlarging the pores during etching. In an embodiment of the present invention, increasing the concentration of a second acid in the electrolyte containing two or more acids or increasing the temperature of the electrolyte containing two or more acids will result in a higher speed for enlarging the diameter of pores or a shorter time for enlarging the pores.

On the other hand, it is harder to control the size of pores at a higher speed when enlarging the diameter of the pores. Thus, to form pores with a desired shape and diameter on an aluminum substrate surface, it is important to control the concentrations of two or more acids in an electrolyte contacting two or more acids and the temperature of the electrolyte containing two or more acids.

In step (b), the voltage applied on an aluminum substrate is preferred to be 30~180V, more preferably 40~180V, even more preferably 60~180V, especially preferably 70~180V, and most preferably 80~180V. The voltage applied on an aluminum substrate in step (b) is preferred to be at least 30V, since it is easier to form an oxide layer having pores at an interval of 60 nm or greater. In addition, the voltage applied on an aluminum substrate in step (b) is preferred to be 180V or lower, since a device for maintaining the electrolyte at a lower temperature, or a special method for spraying a coolant on the back surface of an aluminum substrate, is not required and anodization is conducted by using a simplified apparatus.

Moreover, in an embodiment of the present invention, the voltage applied on an aluminum substrate in step (b) is preferred to be 20~120V.

In step (b), the voltage application on an aluminum substrate may be set constant from the beginning through the finish of anodization, or may vary during the process. When the voltage is changed during the process, the voltage may be increased intermittently or continuously.

In addition, if the current density shortly after the voltage application on an aluminum substrate is 10 mA/cm$^2$ or lower, the maximum voltage of 40V or higher may be applied from the beginning. Alternatively, it is an option to adjust the voltage for an initial anodization at a voltage of lower than 40V and to increase the voltage intermittently or continuously so that the final voltage will be in a range of 40~180V. Here, "the maximum voltage" indicates the maximum value of the voltage to be applied during step (b).

When voltage is increased intermittently, a level of voltage may be kept for a certain duration or may be temporarily lowered. Also, the voltage may be increased chronologically so that the rate of continuously raising the voltage will be 0.05~5 V/s.

If the voltage is lowered temporarily, the temporary voltage may become zero. However, the electric field on the anode is dissolved when the voltage becomes zero during anodization, and when the electric field is applied again by increasing the voltage from the temporary 0V, partial delamination may occur between the aluminum substrate and the oxide layer, causing uneven thickness of the oxide layer. Therefore, zero voltage is preferred to be avoided during anodization.

In addition, the rate of increasing voltage from one voltage to the next level is not limited specifically as long as the effects of the present invention are achieved. The voltage may be instantaneously raised or gradually raised. However, if the voltage is instantaneously raised, the density of current flowing through the aluminum substrate also instantaneously increases and burning may occur. On the other hand, if the rate of voltage increase is too low, a thick oxide layer may be formed while the voltage is raised. Thus, the rate of voltage increase is preferred to be 0.05~5 V/s. The same applies to the rate of continuously increasing the voltage.

The time for anodization in step (b) conducted by applying a voltage on an aluminum substrate is preferred to be 3~600 seconds, more preferably 30~120 seconds. Time for applying a voltage on an aluminum substrate is preferred to be 3~600 seconds, since it is easier to control the oxide layer formed on the aluminum substrate surface to have a thickness of 0.01~0.8 μm as described later.

If the thickness of the oxide layer on the aluminum substrate surface is less than 0.01 μm, the depth of pores is also less than 0.01 μm. Thus, when the substrate is used as an anodic porous alumina, the molded body to be obtained may not possess sufficient antireflective properties. If the thickness of the oxide layer exceeds 0.8 μm, the pores will be also deeper as the oxide layer is thickened. Accordingly, when the substrate is used as an anodic porous alumina, it may be harder to release from the mold.

(Step (c))

In the method for producing anodic porous alumina according to an embodiment of the present invention, step (c) is for keeping the above aluminum substrate immersed in the electrolyte containing two or more acids while substantially no voltage is applied on the substrate. In an embodiment of the present invention, the voltage applied in step (b) is suspended, and the substrate is kept in the same reaction bath that contains the electrolyte of two or more acids so that the diameter of pores formed in the oxide layer is enlarged. As described, according to an embodiment of the present invention, anodization and etching are conducted on an aluminum substrate in one reaction bath, thereby eliminating an extra process of taking out the aluminum substrate from one bath after finishing anodization to immerse it in another bath. Thus, the production process and production apparatus are both simplified.

In an embodiment of the present invention, after the voltage application on the aluminum substrate is suspended, the longer the aluminum substrate is kept immersed in the electrolyte containing two or more acids, the greater the diameter of pores becomes. In the present application, "suspend voltage application" or "apply substantially no voltage" not only includes zero voltage on an aluminum substrate, but also includes lowering the voltage to a level at which no current flows through the substrate and formation of an oxide layer will not progress.

When the aluminum substrate is kept immersed in an electrolyte containing two or more acids in step (c), the temperature of the electrolyte is preferred to be 5~50° C., more preferably 10~45° C. The temperature of the electrolyte is preferred to be 5~50° C., since it is easier to control the speed of enlarging pore diameters and to form tapered pores. In addition, by setting the temperature of the electrolyte in step (c) the same as in step (b), managing the temperature during production is easier.

Also, in step (c), the duration for immersing the aluminum substrate in an electrolyte containing two or more acids is appropriately adjusted based on the composition and temperature of the electrolyte as described above. Namely, in an embodiment of the present invention, when step (c) is conducted in an electrolyte with a temperature of 10° C. or higher but lower than 25° C., the concentration (M) (mol/L) of phosphoric acid contained in the electrolyte as the second acid and time (T) (min.) for keeping the aluminum substrate immersed in the electrolyte are preferred to satisfy formulas (1) and (2) above, more preferably formulas (2) and (3) above.

In another embodiment of the present invention, when step (c) is conducted in an electrolyte with a temperature of 25° C. or higher but lower than 35° C., the concentration (M') (mol/L) of phosphoric acid contained in the electrolyte as the second acid and time (T') (min.) for immersing the aluminum substrate in the electrolyte are preferred to satisfy formulas (4) and (5) above, more preferably formulas (5) and (6) above.

Moreover, in yet another embodiment of the present invention, when step (c) is conducted in an electrolyte that is 35° C. or higher, the concentration (M") (mol/L) of the phosphoric acid contained in the electrolyte as the second acid and time (T") (min.) for immersing the aluminum substrate in the electrolyte are preferred to satisfy formulas (7) and (8) above.

When the temperature of an electrolyte containing two or more acids, the concentration of a second acid in the electrolyte, and the duration for immersing an aluminum substrate are set at ranges specified in formulas (1)~(8) above, anodic porous alumina is produced efficiently without reducing production yield. In addition, such settings can prevent situations such as a failure to form tapered pores, which is caused by excessive enlargement of nanohole diameters or by slow progress in enlarging pore diameters.

(Step (d))

In the method for producing anodic porous alumina according to an embodiment of the present invention, step (d) is for alternately repeating steps (b) and (c).

The number of steps (d) to be performed, namely, the number of repeating steps (b) and (c), is preferred to be three or more, more preferably five or more, since the greater the number of repeating steps, the smoother the tapered shape of the pores is likely to be. In addition, the upper limit of repeating steps (b) and (c) is preferred to be 10 or less from the viewpoint of production efficiency. Namely, the number of repeating steps in step (d) is preferred to be 3~10, more preferably 5~10.

When the total number of repeating steps (b) and (c) is less than 2, the diameter of the pores decreases unevenly. Thus, when an antireflective product (such as an antireflective film) is fabricated using such anodic porous alumina having uneven pores, the effect of reducing reflectance may be insufficient.

Step (d) may be finished after step (b) or after step (c). However, it is preferred to be finished after step (c) in order to form pores having a tapered shape with a pore diameter continuously decreasing. Pores having a tapered shape are preferable, because the refractive index increases continuously, and the reflectance is suppressed from varying at different wavelengths (dependence on wavelength). Thus, scattering of visible light is suppressed, and a low reflectance is achieved.

The method for producing anodic porous alumina according to an embodiment of the present invention may include a process for forming recesses that become points of origin for forming pores during anodization. More specifically, the following steps may be conducted separately prior to step (a): step (1) for forming anodic oxide layer on the surface of an aluminum substrate using an electrolyte different from the electrolyte containing two or more acids; and step (2) for selectively removing at least part of the anodic oxide layer formed in step (1) using a mixed solution of chromic acid and phosphoric acid or the like.

(Step (1))

As an electrolyte to be used in step (1), an acidic or alkaline solution may be used, but an acidic solution is preferred. Examples of acids are inorganic acids (such as sulfuric acid and phosphoric acid) and organic acids (such as oxalic acid, malonic acid, tartaric acid, succinic acid, malic acid and citric acid) are used. Among those, sulfuric acid, oxalic acid and phosphoric acid are especially preferred. In addition, it is an option to use the same electrolyte used in steps (a)~(d) above.

Oxalic Acid Used as an Electrolyte:

When oxalic acid is used as an electrolyte in step (1), the concentration of oxalic acid is preferred to be 0.7 mol/L or lower. If the oxalic acid concentration exceeds 0.7 mol/L, the current flow value is too high and may result in a roughened surface of the oxide layer.

The temperature of the electrolyte in step (1) is preferred to be 60° C. or lower, more preferably 45° C. or lower. If the temperature of the electrolyte exceeds 60° C., so-called burning may occur, causing pores to be damaged or the surface to be dissolved, resulting in an irregular array of pores.

Sulfuric Acid Used as an Electrolyte:

When sulfuric acid is used as an electrolyte in step (1), the sulfuric acid concentration is preferred to be 0.7 mol/L or lower. If the sulfuric acid concentration exceeds 0.7 mol/L, the current flow value is too high to maintain a constant voltage.

The temperature of the electrolyte is preferred to be 30° C. or lower, more preferably 20° C. or lower. If the temperature of the electrolyte exceeds 30° C., so-called burning may occur, causing pores to be damaged or the surface to be dissolved, resulting in an irregular array of pores.

The voltage value and conditions when a voltage is applied on an aluminum substrate in step (1) may be the same as those in step (b) above. Also, since the thickness of an oxide layer is in proportion to the total electric power obtained by multiplying the current density with oxidation time, the voltage, current density and oxidation time may be appropriately adjusted so as to achieve a desired thickness of the oxide layer. The duration for applying a voltage on an aluminum substrate is preferred to be at least 5 minutes but no longer than 120 minutes from the viewpoint of productivity of anodic porous alumina.

The thickness of an oxide layer formed in step (1) is preferred to be 0.5~10 μm. If the thickness of an oxide layer is within the range, when the oxide layer is removed in subsequent step (2), the trace of mechanical polish is well removed from the aluminum substrate surface and differences in grain boundaries will not be so large as to be visibly identified. Accordingly, macro roughness derived from the anodic porous alumina is prevented from being transferred onto the surface of a molded article.

The thickness of the oxide layer formed in step (1) is in proportion to the total electric power consumed when the aluminum substrate is anodized in step (1). By adjusting the total electric power, or the ratio of electric power to be consumed per voltage, the thickness of the final oxide layer and the thickness of an oxide layer formed during the initial oxidation process are controlled.

(Step (2))

Step (2) is for removing at least part of the oxide layer formed in step (1). In step (2), part of or the entire oxide layer may be removed by immersing the substrate in a solution that does not dissolve aluminum but dissolves alumina (oxide layer) selectively. Examples of such a solution are a mixed solution of chromic acid and phosphoric acid and the like.

In step (2), the duration for immersing the aluminum substrate in the solution described above may be appropriately adjusted based on the thickness of the oxide layer to be removed or the concentrations of chromic acid and phosphoric acid. It is preferred to be 15~300 minutes from the viewpoint of productivity of anodic porous alumina.

According to an embodiment of the present invention, a detailed description is provided below by referring to FIG. 1 for the method for producing anodic porous alumina characterized by including the aforementioned steps (a)~(d). Here, steps (1) and (2) above are also included.

First, after mechanical polishing of aluminum substrate 10, a voltage is applied to anodize a surface of the aluminum substrate to form an oxide layer (step (1)). The pores in the initial stage of step (1) are formed at random in a less ordered array. However, when anodization is conducted longer, the degree of order of the pore array gradually improves as the pores deepen. Accordingly, as shown in FIG. 1(A), for example, oxide layer 14 with multiple pores 12 in a highly ordered array is formed on a surface of aluminum substrate 10. In addition, after step (1), by removing at least part of such as the upper portion of pores, or the entire anodic oxide layer where pores are formed at random (step (2)), oxide layer 14 with multiple recesses 16 in an ordered array is formed on a surface of aluminum substrate 10 as shown in FIG. 1(B), for example.

When above steps (a)~(d) are conducted using the aluminum substrate with multiple recesses 16, recesses 16 work as the points of origin for forming pores and anodic porous alumina is produced having pores in a more highly ordered array.

Next, aluminum substrate 10 having multiple recesses 16 is immersed in an electrolyte containing two or more acids (step (a)). Then, to conduct an anodizing process, a voltage is applied on aluminum substrate 10 immersed in the electrolyte containing two or more acids. Accordingly, aluminum substrate 10 is anodized and oxide layer 14 having multiple pores 12 is formed again as shown in FIG. 1(C) (step (b)).

Then, the voltage application on aluminum substrate 10 is suspended, and aluminum substrate 10 is kept immersed in the same reaction bath containing the electrolyte of two or more acids. Accordingly, as shown in FIG. 1(D), part of oxide layer 14 is removed and the diameter of pores 12 is enlarged (step (c)). After that, step (b) for applying a voltage, and step (c) for keeping aluminum substrate 10 immersed in the electrolyte containing two or more acids while the voltage application is suspended, are alternately repeated (step (d)). As a result, as shown in FIG. 1(E), the shape of pores 12 tapers, with the diameter gradually decreasing from the opening toward the bottom of each pore. Accordingly, anodic porous alumina 18 is obtained where oxide layer 14 having multiple pores 12 in an ordered array is formed on a surface of aluminum substrate 10.

In an embodiment of the present invention, when anodic porous alumina is produced by conducting steps (a)~(d) after steps (1) and (2), the current density shortly after a voltage is applied in step (b) may be set at 10 mA/cm$^2$ or lower, more preferably 5 mA/cm$^2$ or lower. Shortly after the voltage application starts, by setting the current density to be 10 mA/cm$^2$ or lower, namely, by preventing a sudden increase in current, the surface of anodic porous alumina is suppressed from becoming cloudy. Thus, when the microscopic pattern of the anodic porous alumina is transferred, an increase in haze is effectively suppressed in the obtained molded article. Accordingly, a molded article is obtained to have a lower reflectance. Especially the current density shortly after the voltage application is preferred to be set at 5 mA/cm$^2$ or lower, since the surface of anodic porous alumina is further suppressed from clouding, and an increase in haze is even further suppressed in the molded article.

In the present application, "shortly after voltage application" indicates a period within 10 seconds after the beginning of the voltage application. In an embodiment of the present invention, the current density after 10 seconds have elapsed since the beginning of the voltage application is not limited specifically, and the current density of 10 mA/cm$^2$ or lower may be maintained, or the current density may exceed 10 mA/cm$^2$. However, an increase in voltage tends to result in a higher current density.

(Effects)

As described above, in an anodizing process and an etching process (steps (b)~(c)) of the method for producing anodic porous alumina according to an embodiment of the present invention, the anodizing process is conducted by immersing an aluminum substrate in an electrolyte containing two or more acids, and then the etching process is conducted by keeping the aluminum substrate immersed in the electrolyte used for the anodizing process. Namely, conducting both anodizing and etching processes in one reaction bath simplifies the method for producing anodic porous alumina having anodized aluminum (oxide layer) with tapered pores formed therein. The above method can eliminate an extra process of taking out the aluminum substrate from one bath after finishing the anodization process to immerse it in another bath for etching. Accordingly, multiple tapered pores are formed on the surface of an aluminum substrate by using a simplified apparatus and fewer steps.

(Anodic Porous Alumina)

Using the method for producing anodic porous alumina according to an embodiment of the present invention, tapered pores with a diameter decreasing gradually from the opening toward the bottom are formed in an ordered array on the surface of an aluminum substrate. As a result, anodic porous alumina is obtained to have an oxide layer with multiple pores formed on the surface of an aluminum substrate.

The interval of pores in the anodic porous alumina according to an embodiment of the present invention is preferred to be the same as or shorter than the wavelength of visible light, more preferably 150~600 nm. If the interval of pores is 150 nm or greater, when a molded article (such as an antireflective product) is obtained by transferring the surface of anodic porous alumina produced by the method for producing anodic porous alumina related to the present invention, scratch resistance is enhanced without sacrificing the antireflective properties, and the molded article is suppressed from becoming cloudy as a result of integrated protrusions. If the interval of pores is 600 nm or less, scattering of visible light is less likely to occur on the surface (transferred surface) of a molded article obtained by transferring the surface of anodic porous alumina. Thus, excellent antireflective properties are achieved, making such a molded article suitable for fabricating antireflective products such as antireflective film.

When anodic porous alumina is used for fabricating antireflective products (such as antireflective film), in addition to an interval of 600 nm or less, the pores are preferred to have a depth of 100 nm or greater, more preferably 150 nm or greater. When anodic porous alumina having a pore depth of less than 100 nm is used, sufficient antireflective properties may not be achieved for antireflective products. The upper limit of the pore depth is preferred to be 500 nm or less, more preferably 400 nm or less. A pore depth of 500 nm or less is preferred, since protrusions having an inverse shape of pores exhibit mechanical strength in the obtained antireflective product. Namely, when anodic porous alumina is used for fabricating antireflective products (such as antireflective film), the depth of pores is preferred to be 100~500 nm, more preferably 150~400 nm.

Also, the aspect ratio (depth/interval) of pores in anodic porous alumina is preferred to be 0.25 or greater, more preferably 0.5 or greater, most preferably 0.75 or greater. An aspect ratio of 0.25 or greater will result in a surface with low reflectance, and its incident angle dependence is sufficiently small. In addition, considering the mechanical strength of protrusions that have an inverse shape of pores, the upper limit of the aspect ratio of the pores in anodic porous alumina is preferred to be four or lower.

Mold-release treatment may be conducted on the surface of anodic porous alumina with an oxide layer having multiple pores to make the alumina easier to remove from a mold. Examples of mold-release treatment are coating with a phosphate ester polymer, silicone polymer, fluorine polymer or the like; depositing fluorine compounds; coating with a fluorine-based treatment agent or fluorine-silicone-based treatment agent; and the like.

(Method for Forming Molded Article)

According to an embodiment of the present invention, the method for forming a molded article having a microscopic pattern is characterized by the following: producing anodic porous alumina by step (a) for immersing an aluminum substrate in an electrolyte containing two or more acids, step (b) for applying a voltage on the aluminum substrate immersed in the electrolyte, step (c) for keeping the aluminum substrate immersed in the electrolyte while applying substantially no voltage on the aluminum substrate, and step (d) for alternately repeating steps (b) and (c); and on a surface of a molded article, transferring the microscopic pattern made of multiple pores formed on the surface of anodic porous alumina. On the surface of the molded article fabricated by transferring the microscopic pattern (pores) of anodic porous alumina, the microscopic pattern is transferred to form an inverse structure (protrusions) having a relationship of key to keyhole.

To transfer the microscopic pattern of anodic porous alumina on a surface of a molded article, for example, it is preferred to employ the following method: an active-energy-ray curable resin composition (hereinafter may also be referred to as "resin composition") is filled between anodic porous alumina and a transparent material (molding body); active energy rays are irradiated where the resin composition is in contact with the microscopic pattern of anodic porous alumina so that the resin composition is cured; and the anodic porous alumina is removed from the mold. Accordingly, a molded article is obtained on the surface of the transparent material having a microscopic pattern made of a cured active-energy-ray curable resin composition. The obtained microscopic pattern on the molded article is the inverse pattern of the microscopic pattern of anodic porous alumina.

(Molded Article)

Examples of a transparent material are preferred to be those that will not inhibit irradiation of active energy rays because active energy rays are irradiated through the transparent material. The examples of a transparent material are polyester resins (such as polyethylene terephthalate and polybutylene terephthalate), polymethacrylate resins, polycarbonate resins, vinyl chloride resins, ABS resins, styrene resins, glass and the like.

(Active-Energy-Ray Curable Resin Composition)

To transfer the microscopic pattern of anodic porous alumina onto a surface of a molded article, using an active-energy-ray curable resin composition is preferable because heating and cooling processes are not required in contrast to a method using a thermosetting resin composition. Thus, the method is suitable for mass production since the microscopic pattern is transferred in a shorter period of time.

To fill an active-energy-ray curable resin composition, the composition is supplied between anodic porous alumina and a transparent material and then pressed so that the composition is spread evenly, the composition is coated in advance on anodic porous alumina and then a transparent material is laminated thereon, the composition is coated in advance on a transparent material and then anodic porous alumina is laminated thereon, and so on.

An active-energy-ray curable resin composition contains a polymerizable compound and an active-energy-ray polymerization initiator. If applicable, in addition to such components, non-reactive polymers, active-energy-ray sol-gel reactive components or the like may also be contained. Moreover, various additives such as a thickening agent, leveling agent, ultraviolet absorber, light stabilizer, heat stabilizer, solvent and inorganic filler, may also be contained.

Examples of a polymerizable compound are monomers, oligomers, reactive polymers and the like having a radically polymerizable bond and/or a cationic polymerizable bond in the molecule. Monomers having a radically polymerizable bond include monofunctional monomers and polyfunctional monomers.

Examples of a monofunctional monomer having a radically polymerizable bond are (meth)acrylate derivatives (such as methyl (meth)acrylate, ethyl (meth)acrylate, propyl (meth)acrylate, n-butyl (meth)acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate, and 2-ethoxyethyl (meth)acrylate), (meth)acrylic acids, (meth)acrylonitriles, styrene derivatives (such as styrene and $\alpha$-methyl styrene), (meth)acrylamide derivatives (such as (meth)acrylamide, N-dimethyl (meth)acrylamide, N-diethyl (meth)acrylamide, and dimethylaminopropyl (meth)acrylamide), and the like. These may be used alone or in combination thereof.

Examples of polyfunctional monomers having a radically polymerizable bond are difunctional monomers (such as ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxy polyethoxy phenyl)propane, 2,2-bis(4-(meth)acryloxyethoxy phenyl)propane, 2,2-bis(4-(3-(meth)acryloxy-2-hydroxypropoxy phenyl)propane, 1,2-bis(3-(meth)acryloxy-2-hydroxypropoxy) ethane, 1,4-bis(3-(meth)acryloxy-2-hydroxypropoxy) butane, dimethyloltricyclodecane di(meth)acrylate, ethylene oxide adduct di(meth)acrylate of bisphenol A, propylene oxide adduct di(meth)acrylate of bisphenol A, hydroxypivalic acid neopentyl glycol di(meth)acrylate, divinyl benzene, and methylenebisacrylamide), trifunctional monomers (such as pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, and isocyanuric acid ethylene oxide-modified tri(meth)acrylate), tetrafunctional or higher functional monomers (such as a condensation reaction mixture of succinic acid/trimethylolethane/acrylic acid, dipentaerythritol hexa(meth)acrylate, dipentaerythritol penta(meth)acrylate, ditrimethylolpropane tetraacrylate, and tetramethylolmethane tetra(meth)acrylate), bifunctional or higher functional urethane acrylates, bifunctional or higher polyester acrylates, and the like. These may be used alone or in combination thereof.

Examples of monomers having a cationic polymerizable bond are epoxy groups, oxetanyl groups, oxazolyl groups, vinyl oxy groups and the like, and monomers having an epoxy group are especially preferred.

Examples of oligomers or reactive polymers having a radically polymerizable bond and/or cationic polymerizable bond in the molecule, are unsaturated polyesters such as condensates of unsaturated di carboxylic acids with polyhydric alcohols, polyester (meth)acrylate, poly ether (meth)acrylate, polyol (meth)acrylate, epoxy (meth)acrylate, urethane (meth)acrylate, cationically polymerizable epoxy compounds, homopolymers or copolymerized polymers of the above-mentioned monomers having a radically polymerizable bond in a side chain, and the like.

For the active-energy-ray polymerization initiator, a known polymerization initiator may be used. It is preferred to appropriately select an initiator according to the kind of active energy rays to be used when curing the active-energy-ray curable resin composition.

When using a photocuring reaction, examples of a photopolymerization initiator are carbonyl compounds (such as benzoin, benzoin methyl ether, benzoin ethyl ether, benzoin isopropyl ether, benzoin isobutyl ether, benzyl, benzophenone, p-methoxy benzophenone, 2,2-diethoxyacetophenone, $\alpha,\alpha$-dimethoxy-$\alpha$-phenyl acetophenone, methylphenyl glyoxylate, ethylphenyl glyoxylate, 4,4"-bis(dimethylamino) benzophenone, and 2-hydroxy-2-methyl-1-phenylpropane-1-one), sulfur compounds (such as tetramethyl thiuram monosulfide and tetramethyl thiuram disulfide), 2,4,6-trimethyl benzoyl diphenyl phosphine oxide, benzoyl diethoxy phosphine oxide, and the like. These may be used alone or in combination thereof.

When using an electron beam curing reaction, examples of a polymerization initiator are benzophenone, 4,4-bis (diethylamino)benzophenone, 2,4,6-trimethyl benzophenone, methyl-ortho-benzoyl benzoate, 4-phenyl benzophenone, t-butyl anthraquinone, 2-ethyl anthraquinone, thioxanthones (such as 2,4-diethyl thioxanthone, isopropyl thioxanthone, and 2,4-dichloro thioxanthone), acetophenones (such as diethoxyacetophenone, 2-hydroxy-2-methyl-1-phenylpropan-1-one, benzyl dimethyl ketal, 1-hydroxycyclohexyl-phenyl ketone, 2-methyl-2-morpholino (4-thiomethylphenyl) propan-1-one, and 2-benzyl-2-dimethylamino-1-(4-morpholinophenyl)-butanone), benzoin ethers (such as benzoin methyl ether, benzoin ethyl ether, benzoin isopropyl ether, and benzoin isobutyl ether), acryl phosphine oxides (such as 2,4,6-trimethyl benzoyl diphenyl phosphine oxide, bis(2,6-dimethoxybenzoyl)-2,4,4-trimethyl pentyl phosphine oxide, and bis(2,4,6-trimethyl benzoyl)-phenyl phosphine oxide), methyl benzoyl formate, 1,7-bis acridinyl heptane, 9-phenyl acridine, and the like. These may be used alone or in combination thereof.

The amount of an active-energy-ray polymerization initiator in an active-energy-ray curable resin composition is preferred to be 0.1~10 parts by mass based on 100 parts by mass of the polymerizable compound. If the amount of an active-energy-ray polymerization initiator is less than 0.1 parts by mass based on 100 parts by mass of the polymerizable compound, polymerization is hard to progress. On the other hand, if the amount of an active-energy-ray polymerization initiator exceeds 10 parts by mass based on 100 parts by mass of the polymerizable compound, coloration may occur in the cured resin, or the mechanical strength of the cured resin may be insufficient. The amount of an active-energy-ray polymerization initiator is preferred to be 0.1~10 parts by mass based on 100 parts by mass of the polymerizable compound, since polymerization tends to progress well, and coloration of the cured resin or insufficient mechanical strength of the cured resin will not result.

Examples of a non-reactive polymer are acrylic resins, styrene resins, polyurethane resins, cellulose resins, polyvinyl butyral resins, polyester resins, thermoplastic elastomers and the like.

Examples of an active-energy-ray sol-gel reaction composition are alkoxysilane compounds, alkyl silicate compounds and the like.

Examples of an alkoxysilane compound are those represented by $R_xSi(OR')_y$. Here, R and R' each indicate an alkyl group having 1 to 10 carbon atoms; "x" and "y" are integers that satisfy the relationship of x+y=4. Specific examples are tetramethoxysilane, tetra-iso-propoxysilane, tetra-n-propoxysilane, tetra-n-butoxysilane, tetra-sec-butoxysilane, tetra-tert-butoxysilane, methyl triethoxysilane, methyl tripropoxysilane, methyl tributoxysilane, dimethyl dimethoxysilane, dimethyl diethoxysilane, trimethyl ethoxysilane, trimethyl methoxysilane, trimethyl propoxysilane, and trimethyl butoxy silane.

Examples of an alkyl silicate compound are those represented by $R^1O[Si(OR_3)(OR_4)O]_zR^2$. Here, $R^1$~$R^4$ each represent an alkyl group having 1 to 5 carbon atoms, and "z" is an integer of 3-20. Specific examples are methyl silicate, ethyl silicate, isopropyl silicate, n-propyl silicate, n-butyl silicate, n-pentyl silicate, acetyl silicate and the like.

(Fabrication Apparatus)

Figure 2:
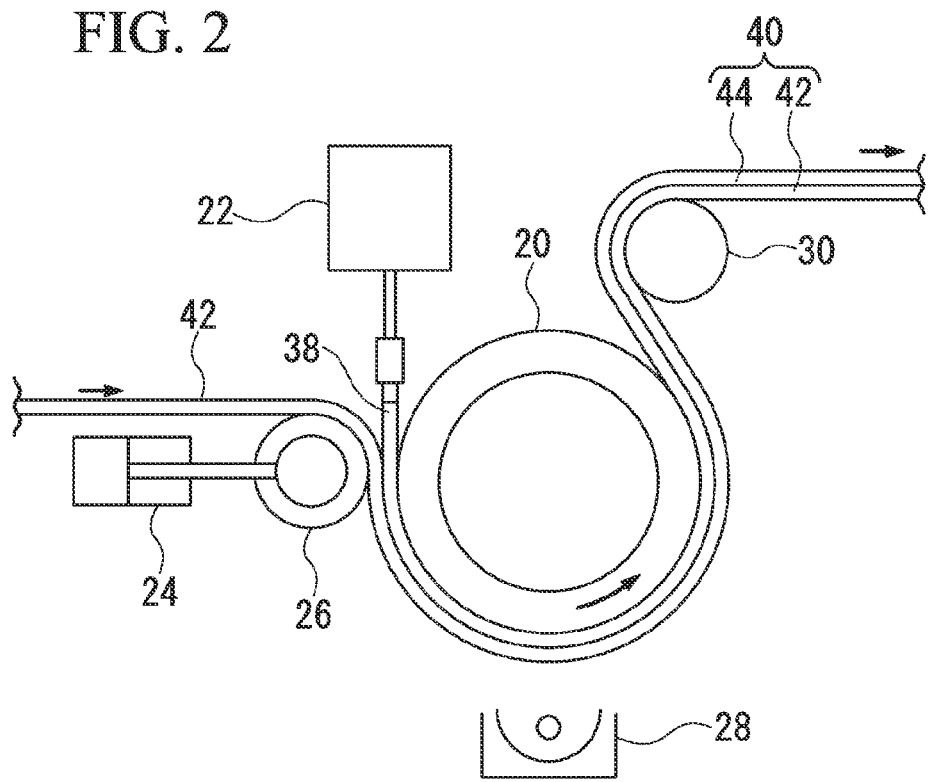
FIG. 2 is a view showing a structural example of an apparatus for producing a molded article having a microscopic pattern on its surface.

A molded article having a microscopic pattern on its surface is fabricated as follows using a fabrication apparatus shown in FIG. 2, for example.

Between roll-shaped mold 20 having a microscopic pattern (not shown) on its surface and belt-type film 42 (transparent material) that moves along the surface of roll-shaped mold 20, active-energy-ray curable resin composition 38 is supplied from tank 22.

Between roll-shaped mold 20 and nip roll 26 whose nip pressure is adjusted by air cylinder 24, film 42 and active-energy-ray curable resin composition 38 are nipped so that active-energy-ray curable resin composition 38 is evenly spread between film 42 and roll-shaped mold 20 and is filled in the recessed portions in the microscopic pattern of roll-shaped mold 20.

From active-energy-ray irradiation apparatus 28 located under roll-shaped mold 20, active-energy rays are irradiated at active-energy-ray curable resin composition 38 through film 42. By curing active-energy-ray curable resin composition 38, cured-resin layer 44 is formed where the microscopic pattern on the surface of roll-shaped mold 20 is transferred.

Figure 3:
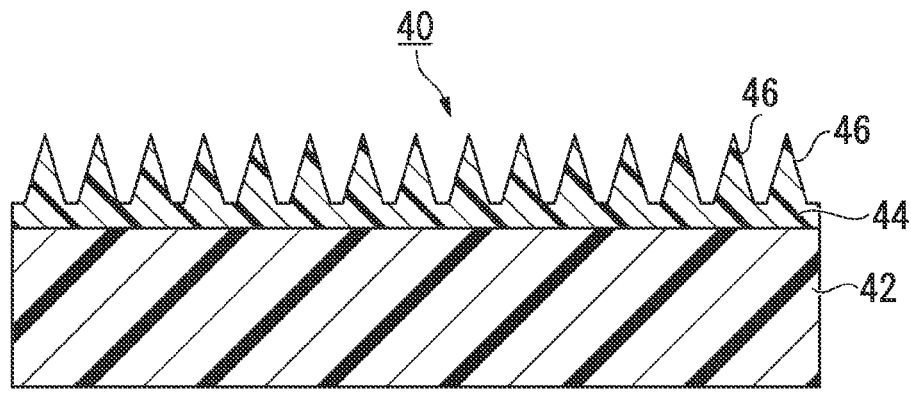
FIG. 3 is a cross-sectional view showing an example of a molded article having a microscopic pattern on its surface.

Using release roll 30, film 42 with cured resin layer 44 formed thereon is removed from roll-shaped mold 20. Accordingly, molded article 40 as shown in FIG. 3 is obtained.

As for active-energy-ray irradiation apparatus 28, a high-pressure mercury lamp, metal halide lamp and the like may be used.

The radiation amount of active-energy rays is usually approximately 100~40000 $mJ/cm^2$, but any other amount may be used as long as the curing of the active-energy-ray curable resin composition progresses.

When fabricating a molded article having a microscopic pattern according to an embodiment of the present invention as described above, a molded article having a pattern that is the inverse of the microscopic pattern of the anodic porous alumina can be produced by a simplified process, using anodic porous alumina obtained by the method for producing anodic porous alumina related to the present invention.

In addition, according to the aforementioned method for producing anodic porous alumina related to the present invention, anodization and etching of an aluminum substrate are conducted in one bath, thus eliminating an extra process of taking out the aluminum substrate from one bath to immerse it in another bath for etching. Multiple tapered pores are formed on the aluminum substrate surface by a simplified apparatus using fewer steps. Accordingly, using anodic porous alumina obtained by the method for producing anodic porous alumina according to an embodiment of the present invention, a molded article having tapered pores on its surface is fabricated by a simplified method using fewer steps.

(Molded Article)

Molded article 40 fabricated as above has cured resin layer 44 on the surface of film 42 (transparent material) as shown in FIG. 3.

Cured resin layer 44 is a cured film of an active-energy-ray curable resin composition, and has a microscopic pattern on its surface.

When anodic porous alumina related to the present invention is used, the multiple pores on the oxide layer surface are transferred to form a microscopic pattern on the surface of molded article 40. Molded article 40 has multiple protrusions 46 made of the cured active-energy-ray curable resin composition.

A preferred example of a microscopic pattern is a so-called moth-eye structure where multiple substantially conical- or pyramid-shaped protrusions (convex portions) are arrayed. A moth-eye structure where the interval of protrusions is shorter than the wavelength of visible light is known to have effective antireflective properties since the refractive index continuously increases from the refractive index of air to that of the material.

(Usage)

A molded article having a microscopic pattern obtained in the present invention exhibits various functions such as antireflection and water repellency derived from the microscopic pattern formed on its surface.

When a molded article having a microscopic pattern on its surface is a sheet or film type, it may be laminated on surfaces of products or inserted as antireflective film into products such as an image display device (TV set, display of a cell phone, etc.), an exhibition panel, a meter panel and the like. In addition, utilizing its water repellency, a molded article may also be used as a member in products that are exposed to rain, water, steam or the like, for example, windows and mirrors in a bathroom, solar cell members, automobile mirrors, billboards, lenses of eyeglasses and the like.

When a molded article having a microscopic pattern on its surface is a three-dimensional shape, an antireflective product is fabricated in advance using a transparent material in a desired shape, and the molded article is used as a member on the surface of the product.

When a molded article is used in an image display device, the molded article with a microscopic pattern on its surface may be laminated on the front plate or used as the front plate itself. For example, a molded article with a microscopic pattern may be used on a surface of the rod-lens array attached to a sensor array that reads images, on the cover glass of an image sensor in a facsimile machine, copier, scanner or the like, on the contact glass of a copier to put a document on, and so forth. In addition, when a molded article with a microscopic pattern on its surface is used in the light receiving section of optical communication devices such as visible light communication systems, signal receiving sensitivity is enhanced.

A molded article having the microscopic pattern on its surface may also be used for optical applications such as an optical waveguide, relief hologram, optical lens and polarizing beamsplitter, as well as for bio applications such as a cell culture sheet, in addition to the above applications.

A molded article with a microscopic pattern formed on its surface is not limited to molded article 40 shown as an example in FIG. 3. For example, cured resin layer 44 may be omitted to directly form a microscopic pattern on a surface of film 42 by thermal imprinting. However, a microscopic pattern formed on a surface of cured resin layer 44 is preferred, since a microscopic pattern is efficiently formed using roll-shaped mold 20.

EXAMPLES

In the following, the present invention is described in detail by referring to examples. However, the present invention is not limited to those examples.

Various measurements and evaluations are conducted as follows.

(Measuring Pores of Anodic Porous Alumina)

Anodic porous alumina with an oxide film on its surface was prepared, and a piece was cut from the alumina. Then, platinum was deposited on the surface for 1 minute. Using a field emission scanning electron microscope ("JSM-6701F" made by JOEL Ltd.), the piece was enlarged 10,000 times at an accelerating voltage of 3.00 kV for observation. The interval (pitch) of pores was measured as the average value of the distances measured between the adjacent centers of six pores arrayed on a straight line.

In addition, two pieces were cut out from different portions of the anodic porous alumina, and platinum was deposited for 1 minute onto their cross sections. The same as above, the pieces were observed at an accelerating voltage of 3.00 kV by using the field emission scanning electron microscope. Each cross-sectional sample was enlarged 50,000 times for observation, 10 pores were selected at random within the field of view to measure their depths, and average values were obtained. Such measurements were conducted at two locations, and the average values at each of the two locations were further averaged to determine the average depth of the pores.

(Evaluating Tapered Pores)

Two pieces were cut out from different portions of the anodic porous alumina, and platinum was deposited for 1 minute onto their cross sections. The same as above, the pieces were observed at an accelerating voltage of 3.00 kV by using a field emission scanning electron microscope. Each cross-sectional sample was enlarged 50,000 times for observation. The opening and bottom of pores within the field of view were measured and evaluated based on the evaluation criteria below.

bottom<opening: A
bottom<opening (disturbed shape): B
bottom=opening: C

Here, the bottom of a pore indicates a position 10 nm above the lowermost of the pores, and the opening of a pore indicates a position 10 nm down from the uppermost of the pores toward the bottom.

(Measuring Protrusion in Molded Article)

After platinum was deposited for 10 minutes on a surface and a cross section of a molded article (film), the surface and cross section were observed under the conditions of an accelerating voltage of 3.00 kV by using a field emission scanning electron microscope ("JSM-6701F" made by JOEL Ltd.).

The surface of the molded article was enlarged 10,000 times and the interval (pitch) of protrusions was measured as the average value of the distances between the centers of six adjacent protrusions (convex portions) arrayed on a straight line. In addition, the cross section of the molded article was enlarged 50,000 times for observation, 10 protrusions were selected at random, and their heights were averaged to obtain an average height of the protrusions.

Example 1

Producing Anodic Porous Alumina

A plate of aluminum with a purity level of 99.9 mass % and a thickness of 0.4 mm was cut into a 50 mm×50 mm piece. A surface of the aluminum piece was polished to make it into a mirror surface. The piece was used as an aluminum substrate.

Next, a 0.3M oxalic acid solution was set at a temperature of 15.7° C., in which the aluminum substrate was immersed for anodization at 40V for 6 hours. Accordingly, an oxide layer with pores was formed. The aluminum substrate with an oxide layer formed thereon was immersed for at least 12 hours in a 70° C. solution containing oxalic acid at 6 mass % and chromic acid at 1.8 mass % so that the oxide layer was dissolved away to expose recesses that work as the points of origin for forming pores during anodization.

Step (a):

Next, an electrolyte containing a 0.3M oxalic acid solution and a 0.1M phosphoric acid solution was set at a temperature of 15.5° C., in which the aluminum substrate was immersed.

Step (b):

The aluminum substrate was anodized at 40V for 60 seconds and an oxide layer having pores was formed on the aluminum substrate surface.

Step (c):

The voltage application on the aluminum substrate having an oxide layer on its surface was suspended, and the aluminum substrate was immersed for 60 minutes in the 15.5° C. electrolyte in the same bath. Accordingly, the oxide layer was dissolved away, exposing recesses that become the points of origin for forming pores during anodization.

Step (d):

After step (c), the voltage application was resumed on the aluminum substrate with exposed portions that work as points of origin for forming pores, and the substrate was anodized in the 15.5° C. electrolyte at 40V for 120 seconds. Accordingly, an oxide layer was formed again on the aluminum substrate surface.

Then, voltage application on the aluminum substrate having an oxide layer on its surface was suspended, and the aluminum substrate was immersed for 60 minutes in the 15.5° C. electrolyte in the same bath so as to enlarge the diameter of pores of the oxide layer.

Steps (b) and (c) were further repeated alternately four times each, with step (c) being conducted last. Namely, steps (b) and (c) were each conducted a total of five times.

After that, the substrate was washed with deionized water, and the water on the surface was removed by air blow. Accordingly, anodic porous alumina having pores in a substantially cone shape, namely, in a tapered shape, was obtained. The interval of the pores was 100 nm, and the average depth of the pores was approximately 200 nm.

(Fabrication of Molded Article)

Between anodic porous alumina with mold-release treatment conducted thereon and an 80 μm-thick transparent TAC film (triacetyl cellulose film) (brand name: TD80ULM, made by Fujifilm Co., Ltd.), the active-energy-ray curable resin composition as specified below was filled, and ultraviolet rays were irradiated using a fusion lamp to a total light amount of 1000 mJ/cm$^2$ to cure the active-energy-ray curable resin composition. Then, the anodic porous alumina was removed, and a molded article (film) made of the transparent material and the cured resin composition was obtained.

A microscopic pattern was formed on the molded article surface. The average interval (pitch) of protrusions was 100 nm, and the average height of protrusions was approximately 200 nm.

Composition of Active-Energy-Ray Curable Resin Composition:

dipentaerythritol hexaacrylate (made by Shin-Nakamura Chemical Co., Ltd.): 25 parts by mass pentaerythritol triacrylate (made by Dai-ichi Kogyo Seiyaku Co., Ltd.): 25 parts by mass ethylene oxide-modified dipentaerythritol hexaacrylate (made by Nippon Kayaku Co., Ltd.): 25 parts by mass polyethylene glycol diacrylate (made by Toagosei Co., Ltd.): 25 parts by mass 1-hydroxycyclohexyl phenyl ketone (made by BASF): 1 part by mass his (2,4,6-trimethyl benzoyl)-phenyl phosphine oxide (made by BASF): 0.5 parts by mass polyoxyethylene alkyl (C12-15) ether phosphate (made by Nippon Chemicals Co., Ltd.): 0.1 parts by mass Examples 2~23, Comparative Example 1

Anodizing and etching processes on an aluminum substrate were conducted in each of the examples and comparative examples the same as in Example 1 except that the composition of the electrolyte containing two or more acids, temperatures, voltage for anodization and etching time employed in steps (a)~(d) were changed as specified in Tables 1~3 to obtain anodic porous alumina and molded articles. Evaluation results are shown in Tables 1~3.

In Examples 2~6 and 20, step (c) was conducted in an electrolyte with a temperature of 10° C. or higher but lower than 25° C. In Examples 7~13, 17~19, 21 and 23, step (c) was conducted in an electrolyte with a temperature of 25° C. or higher but lower than 35° C. In Examples 14~16 and 22, step (c) was conducted in an electrolyte with a temperature of 35° C. or higher.

TABLE 1

|  |  | Example 1 | Example 2 | Example 3 | Example 4 | Example 5 | Example 6 | Example 7 | Example 8 |
|---|---|---|---|---|---|---|---|---|---|
| Multiple acids | Oxalic acid [mol/L] | 0.3 | 0.3 | 0.3 | 0.3 | 0.3 | 0.3 | 0.3 | 0.3 |
|  | Phosphoric acid [mol/L] | 0.2 | 0.5 | 0.5 | 1 | 2 | 2 | 0.1 | 0.2 |
| Step (b) | Temperature of electrolyte for anodization [° C.] | 15.5 | 15.5 | 15.5 | 15.5 | 15.5 | 15.5 | 32 | 32 |
|  | Voltage for anodization [V] | 40 | 40 | 40 | 40 | 40 | 40 | 40 | 40 |
|  | Time per anodization process [sec] | 70 | 120 | 120 | 120 | 120 | 120 | 60 | 70 |
| Step (c) | Temperature of electrolyte for etching [° C.] | 15.5 | 15.5 | 15.5 | 15.5 | 15.5 | 15.5 | 32 | 32 |
|  | Time per etching process [min] | 60 | 60 | 90 | 60 | 60 | 10 | 60 | 60 |
| Step (d) | Repeated times (total) | 5 | 5 | 5 | 5 | 5 | 5 | 5 | 5 |
| Evaluation results | Pitch of pores [nm] | 100 | 100 | 100 | 100 | 100 | 100 | 100 | 100 |
|  | Depth of pores [nm] | 130 | 170 | 170 | 170 | 220 | 250 | 450 | 220 |
|  | Evaluation of nanoholes | A | A | A | A | A | A | A | A |

TABLE 2

|  |  | Example 9 | Example 10 | Example 11 | Example 12 | Example 13 | Example 14 | Example 15 | Example 16 |
|---|---|---|---|---|---|---|---|---|---|
| Multiple acids | Oxalic acid [mol/L] | 0.3 | 0.3 | 0.3 | 0.3 | 0.3 | 0.3 | 0.3 | 0.3 |
|  | Phosphoric acid [mol/L] | 0.5 | 0.5 | 2 | 2 | 2 | 0.1 | 0.5 | 2 |
| Step (b) | Temperature of electrolyte for anodization [° C.] | 32 | 30 | 30 | 32 | 32 | 40 | 40 | 40 |
|  | Voltage for anodization [V] | 40 | 40 | 40 | 40 | 40 | 40 | 40 | 40 |
|  | Time per anodization process [sec] | 120 | 60 | 40 | 60 | 60 | 10 | 30 | 10 |
| Step (c) | Temperature of electrolyte for etching [° C.] | 32 | 30 | 30 | 32 | 32 | 40 | 40 | 40 |
|  | Time per etching process [min] | 60 | 20 | 10 | 10 | 30 | 30 | 7 | 3 |
| Step (d) | Repeated times (total) | 5 | 5 | 5 | 5 | 5 | 5 | 5 | 5 |
| Evaluation results | Pitch of pores [nm] | 100 | 100 | 100 | 100 | 100 | 100 | 100 | 100 |
|  | Depth of pores [nm] | 220 | 290 | 260 | 250 | 270 | 130 | 260 | 270 |
|  | Evaluation of nanoholes | B | A | A | A | A | A | A | A |

TABLE 3

| | | Example 17 | Example 18 | Example 19 | Example 20 | Example 21 | Example 22 | Example 23 | Comp Example 1 |
|---|---|---|---|---|---|---|---|---|---|
| Multiple acids | Oxalic acid [mol/L] | 0.05 | 0.3 | 0.3 | 0.3 | 0.3 | 0.3 | 0.3 | 0.3 |
| | Phosphoric acid [mol/L] | 1 | 2 | 2 | 0.1 | 0.1 | 2 | 0.1 | — |
| Step (b) | Temperature of electrolyte for anodization [° C.] | 30 | 30 | 30 | 15.5 | 32 | 40 | 30 | 15.5 |
| | Voltage for anodization [V] | 80 | 80 | 80 | 40 | 40 | 40 | 80 | 40 |
| | Time per anodization process [sec] | 25 | 40 | 40 | 60 | 60 | 10 | 25 | 30 |
| Step (c) | Temperature of electrolyte for etching [° C.] | 30 | 30 | 30 | 15.5 | 32 | 40 | 30 | 15.5 |
| | Time per etching process [min] | 20 | 30 | 10 | 60 | 10 | 30 | 20 | 60 |
| Step (d) | Repeated times (total) | 5 | 5 | 5 | 5 | 5 | 5 | 5 | 5 |
| Evaluation results | Pitch of pores [nm] | 210 | 280 | 300 | 100 | 100 | 100 | 230 | 100 |
| | Depth of pores [nm] | 410 | 750 | 1110 | 210 | 640 | 20 | 1600 | 270 |
| | Evaluation of nanoholes | A | A | A | B | B | B | B | C |

As is clear in Tables 1~3, when anodization and etching were conducted in steps (b) and (c) in one reaction bath by use of an electrolyte containing a first acid and second acid, anodic porous alumina having tapered pores were produced using a simplified apparatus and fewer steps. To produce anodic porous alumina having tapered pores, it was found to be preferable to use oxalic acid as a first acid and phosphoric acid as a second acid, and to combine oxalic acid and phosphoric acid at appropriate concentrations respectively. From the anodic porous alumina obtained in each example, a molded article (film) with a low level of haze was obtained.

In Comparative Example 1, the electrolyte did not contain a second acid, and the diameter of pores was not enlarged at all during etching. Accordingly, tapered pores were not formed.

In Example 20, a second acid was contained in the electrolyte and the temperature of the electrolyte in step (c) was set at 10° C. or higher but lower than 25° C. However, since the relationship of the phosphoric acid concentration and the etching time did not satisfy formula (2), the diameter of pores was not sufficiently enlarged compared with the pores in Examples 1~6.

In Examples 21 and 23, a second acid was contained in the electrolyte, and the temperature of the electrolyte in step (c) was set at 25° C. or higher but lower than 35° C. However, since the relationship of the phosphoric acid concentration and the etching time did not satisfy formula (4), the diameter of pores in each example was not sufficiently enlarged compared with the pores in Examples 7~13 and 17~19.

In Example 23, a second acid was contained in the electrolyte and the temperature of the electrolyte in step (c) was set at 35° C. or higher. However, since the relationship of the phosphoric acid concentration and the etching time did not satisfy formula (6), the diameter of pores was excessively enlarged and the shape of pores was disrupted compared with the pores in Examples 14~16.

INDUSTRIAL APPLICABILITY

According to the embodiments of the present invention, a method is provided for producing anodic porous alumina having multiple pores formed on a surface of an aluminum substrate by using a simplified apparatus and fewer steps. Also, a method is provided for forming tapered pores on a surface of a molded article by using a simplified apparatus and fewer steps.

In addition, a molded article, obtained by a method for fabricating a molded article having a microscopic pattern related to the present invention, is suitable for antireflection products, antifogging products, antifouling products and water-repellent products.

DESCRIPTION OF NUMERICAL REFERENCES 10 aluminum substrate
12 pore
14 oxide layer
16 recess
18 anodic porous alumina
20 roll-shaped mold
22 tank
24 air cylinder
26 nip roll
28 active-energy-ray irradiation apparatus
30 release roll
40 molded article
42 film
44 cured resin layer
46 protrusion

What is claimed is:

1. A method for producing anodic porous alumina where an oxide layer having a plurality of pores is formed on an aluminum substrate surface, comprising:
   step (a) for immersing an aluminum substrate in an electrolyte containing two or more acids, wherein the two or more acids include oxalic acid and phosphoric acid;
   step (b) for applying a voltage on the aluminum substrate immersed in the electrolyte;
   step (c) for keeping the aluminum substrate immersed in the electrolyte while applying substantially no voltage on the aluminum substrate; and
   step (d) for alternately repeating steps (b) and (c),
   wherein the temperature of the electrolyte is at least 10° C. but lower than 25° C., and the phosphoric acid concentration (M) (mol/L) and time (T) (min.) for keeping the aluminum substrate immersed in the electrolyte are set to satisfy the formulas (1) and (2) below, and the time (T) indicates time (min.) per etching treatment on the aluminum substrate in the step (c), $$1 \leq T \leq 90 \quad (1)$$

$$-90(2M-1) \leq T \quad (2).$$

2. The method for producing anodic porous alumina according to claim 1, wherein the temperature of the electrolyte is at least 10° C. but lower than 25° C., and the phosphoric acid concentration (M) (mol/L) and time (T) (min.) for keeping the aluminum substrate immersed in the electrolyte are set to satisfy formula (2) above and (3) below $$1 \leq T \leq 45 \tag{3}.$$

3. A method for producing anodic porous alumina where an oxide layer having a plurality of pores is formed on an aluminum substrate surface, comprising:
  step (a) for immersing an aluminum substrate in an electrolyte containing two or more acids, wherein the two or more acids include oxalic acid and phosphoric acid;
  step (b) for applying a voltage on the aluminum substrate immersed in the electrolyte;
  step (c) for keeping the aluminum substrate immersed in the electrolyte while applying substantially no voltage on the aluminum substrate; and
  step (d) for alternately repeating steps (b) and (c),
  wherein the temperature of the electrolyte is at least 25° C. but lower than 35° C., and the concentration (M') (mol/L) of phosphoric acid and time (T') (min.) for keeping the aluminum substrate immersed in the electrolyte are set to satisfy formulas (4) and (5) below, and the time (T) indicates time (min.) per etching treatment on the aluminum substrate in the electrolyte in the step (c), $$1 \leq T' \leq 70 \tag{4}$$

$$-200M'+70 \leq T' \leq -12.5M'+70 \tag{5}.$$

4. The method for producing anodic porous alumina according to claim 3, wherein the temperature of the electrolyte is at least 25° C. but lower than 35° C., and the phosphoric acid concentration (M') (mol/L) and time (T') (min.) for keeping the aluminum substrate immersed in the electrolyte are set to satisfy formulas (5) above and (6) below $$1 \leq T' \leq 45 \tag{6}.$$

5. A method for producing anodic porous alumina where an oxide layer having a plurality of pores is formed on an aluminum substrate surface, comprising:
  step (a) for immersing an aluminum substrate in an electrolyte containing two or more acids, wherein the two or more acids include oxalic acid and phosphoric acid;
  step (b) for applying a voltage on the aluminum substrate immersed in the electrolyte;
  step (c) for keeping the aluminum substrate immersed in the electrolyte while applying substantially no voltage on the aluminum substrate; and
  step (d) for alternately repeating steps (b) and (c),
  wherein the temperature of the electrolyte is 35° C. or higher and the phosphoric acid concentration (M'') (mol/L) and time (T'') (min.) for keeping the aluminum substrate immersed in the electrolyte are set to satisfy formula (7) below, and the time (T) indicates time (min.) per etching treatment on the aluminum substrate in the electrolyte in the step (c), $$T'' \leq -20M''+70 \tag{7}.$$

6. The method for producing anodic porous alumina according to claim 5, wherein the temperature of the electrolyte is 35° C. or higher, and the phosphoric acid concentration (M'') (mol/L) and time (T'') (min.) for keeping the aluminum substrate immersed in the electrolyte are set to satisfy formula (7) above and formula (8) below $$1 \leq T'' \leq 45 \tag{8}.$$

7. The method for producing anodic porous alumina according to claim 1, wherein the voltage applied on the aluminum substrate in step (b) is set in a range of 20V-120V.

* * * * *